May 22, 1928.  1,670,693

E. W. SIDWELL

FOOT AND LAST MEASURING APPARATUS

Filed July 24, 1925    2 Sheets-Sheet 1

Inventor
E. W. Sidwell
By Marks & Clerk
attys

May 22, 1928.  1,670,693
E. W. SIDWELL
FOOT AND LAST MEASURING APPARATUS
Filed July 24, 1925   2 Sheets-Sheet 2
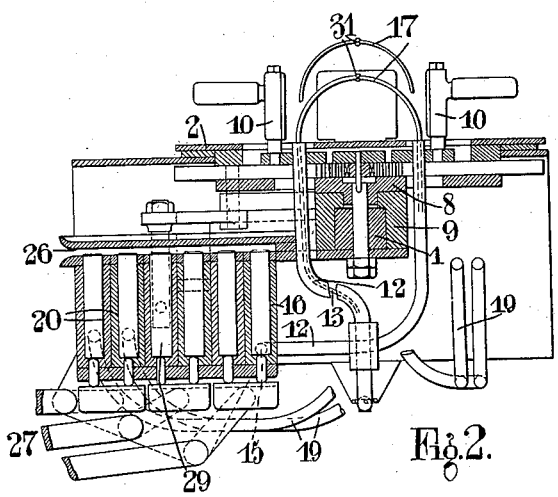
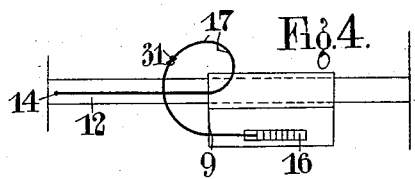
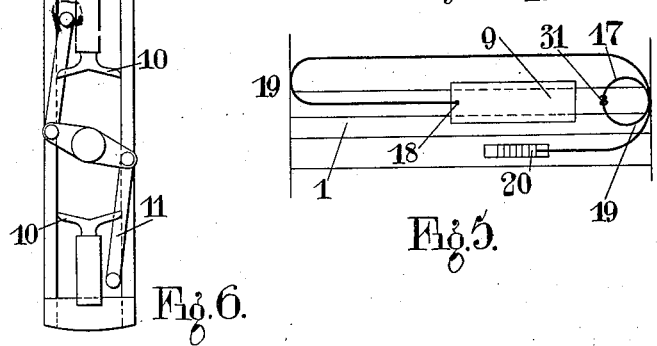
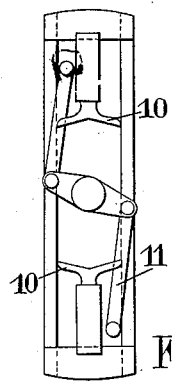
Inventor
E. W. Sidwell
By Marks + Clerk
attys Patented May 22, 1928.

1,670,693

UNITED STATES PATENT OFFICE.

ERNEST WALTER SIDWELL, OF KETTERING, ENGLAND.

FOOT AND LAST MEASURING APPARATUS.

Application filed July 24, 1925, Serial No. 45,943, and in Great Britain December 1, 1924.

This invention relates to apparatus for measuring human feet for ascertaining requirements for accurately fitting boots and shoes and for measuring all kinds of boot and shoe lasts, the invention having particular reference to apparatus for such purposes of the kind comprising a sliding sole plate with devices for locating the heel, toes and ball joint.

The object of the present invention is to devise improvements in the construction of apparatus of the above character which will considerably facilitate the operations involved and which will enable very accurate results to be obtained even in the hands of unskilled persons or persons possessing little or no expert knowledge.

The invention consists in foot and last measuring apparatus of the kind referred to having means for automatically converting movements derived from girth measurement and length measurement into a code letter or other indicator to denote the combined relationship of the girth and length measurements.

The invention also consists in apparatus acocrding to the preceding paragraph comprising a cord or like flexible member for ascertaining the circumference or girth of the foot at the ball joint, one end of the cord being attached to a fixed point in the apparatus while the other end is secured to a movable dimension index box arranged on the moving sole plate so as to be movable therewith.

The invention further consists in apparatus of the above character having index boxes with suitable code letters or other indications marked thereon for giving the various measurements, angles and fitting qualities.

The invention further comprises other details and arrangements hereinafter described or indicated.

The accompanying drawings illustrate diagrammatically one form of apparatus in accordance with the invention.

Figure 2 is a section on the line 2ª—2ª of Figure 1;

Figures 4 and 5 are diagrams hereinafter referred to;

Figure 6 is a view of a modified detail.

Figure 1:
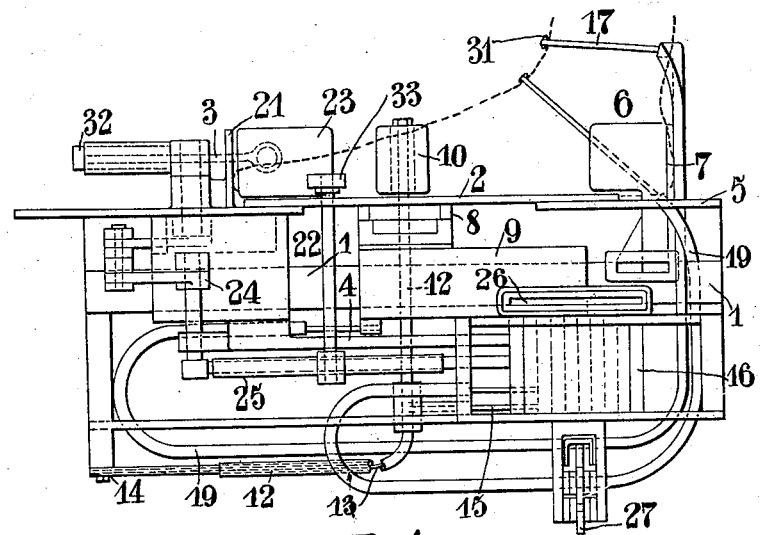
Figure 1 is an elevation.

In carrying my invention into effect in one convenient manner, I form my improved apparatus with a base comprising a main slide bar 1 arranged longitudinally of the apparatus and with its centre line forming the centre line of the apparatus and such base is preferably arranged at an inclination of, say, 30 degrees or any other desired angle to the horizontal so that all sliding parts thereon will automatically return to normal or zero position under the action of gravity.

The base also has mounted thereon footrests 2, levers 3, and sliding members 4 which are required to obtain the correct support of the foot and the required movements as hereinafter referred to.

At one end of the base is provided a fixed platform 5 to support the heel and having a plate 7 in rear thereof and side plates or locators 6 in order to centralize the heel and to fix the back line from which all linear measurements of the foot are calculated.

Figure 3:
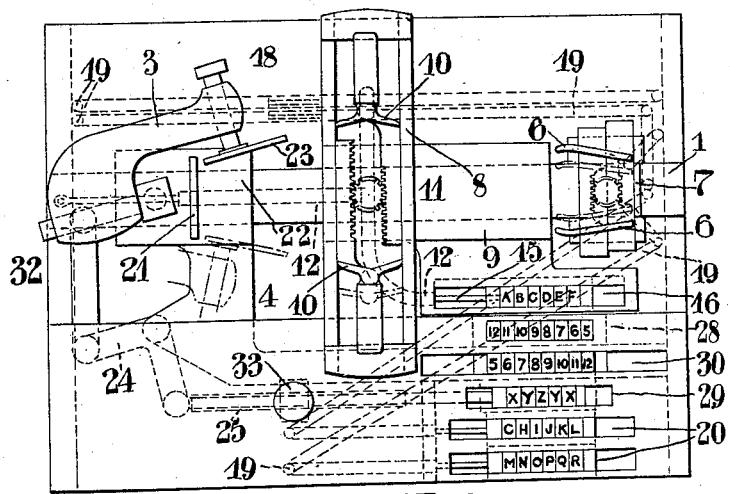
Figure 3 is a plan.

There is also a central sole plate 8 on which the sole of the foot is placed and which is pivoted to a box or other member 9 adapted to slide backwards and forwards in the longitudinal direction upon the main slide bar 1 and in order to ensure that the foot is centrally placed on the apparatus plates or ball joint locators 10 are mounted upon the central sole plate 8, both the ball joint locators and the heel locators being capable of movement towards or away from the centre line but being connected by means of links and pivoted levers (Figure 6) or by racks and pinion (Figure 3) or other suitable means which will ensure that at all times the locators shall be equidistant from the centre line.

To the ball joint locators are secured guidance tubes or pipes 12 through which passes the measuring cord 13 for ascertaining the circumference or girth of the foot at the ball joint, one end of the cord being attached at 14 to fixed point in the apparatus while the other end 15 is secured to a movable dimension index box 16 arranged on the moving sole plate so as to be movable therewith.

At a convenient position in the length of the cord where it encircles the foot the cord is divided and the two ends are adapted to be connected together by means of a brooch 31 or other suitable fastening or uniting device.

When a foot is placed upon the sole plate 8 and the cord 13 is made to encircle the foot the movement of the index box 16 backwards or forwards in its groove in the sliding central sole plate or box 9 is made to correspond with its appropriate position corresponding with one of the various sizes of fitment which may conveniently be denoted by code letters (such as A B C D E F) and when the sliding sole plate 9 is moved along the machine in one direction or the other to accommodate different sizes of feet the distance from the sliding sole plate to the fixed point of the cord will be correspondingly decreased or increased and consequently the length of cord available for measurement is automatically increased or decreased by the same distance. Figure 4 is a diagram illustrating the arrangement just described, 17 denoting the free portion of the cord surrounding the foot.

Similar cord systems with guiding or constraining pipes or tubes 19 are employed for measuring the ankle and instep girth but in these cases the ends of the cords are attached at 18 to the sliding sole plate and to dimension index boxes 20 respectively which are arranged to be slidable in grooves upon a fixed portion of the framework, the index boxes in this case also being provided with code letters (such as G H I J K L and M N O P Q R respectively), or any other desired indications.

A toe indicating device 21 is fitted to a separate sliding block or fitting 22 which is movable longitudinally upon the central slide bar and in addition to the toe end locator there is a toe angle locator 23 which is preferably pivoted so that it may be employed for gauging right or left feet or the right- and left-hand sides of the same foot and by means of suitable linkage 24 and telescopic rod or other connections 25 the toe angle locator is connected to an index box 29 which is arranged in the framework of the machine in a position adjacent to the other index boxes referred to.

All the index boxes 16, 20, 28, 29 and 30 are provided in close juxtaposition and are associated with a device 26 for containing a card so that by the movement of a lever or levers 27 the indicators may be brought into contact with the card for the purpose of printing or recording their indications thereon, an inked ribbon or ribbons or other suitable means being provided for the purpose.

Suitable balance weights are provided for balancing the downward pull of the slides so that the sole plate and toe plate slides remain in equilibrium, requiring very slight movement by the means provided to adjust them to their working positions.

The operation of the machine is as follows:—When a foot to be measured is placed upon the moving foot-rest 2 the heel is placed against the back plate 7 and the heel locators 6 are properly adjusted, thereby centralizing the heel upon the axis of the machine. The moving sole plate 9 is moved to a convenient position so as to bring the pivoted slide 8 carrying the ball joint locators 10 directly under the ball joint of the foot and upon closing the ball joint locators until they lightly engage the foot on each side the foot will be truly centralized. The pivotal slide is then rotated so that the joint locators coincide exactly with the joints of the foot. The exact position of the joint locators is recorded by one of the corresponding code letters in the index box 28, thus indicating the length from heel to ball joint. The toe locator slide 22 is moved into position against the toe and the angle-indicating device 23 is adjusted so that its spindle 32 coincides with the axis of the machine whereupon a button 33 connected with the telescopic rod system 25 is moved into zero position. The button 33 is connected to the outer casing of the telescopic rod by means of a clamping screw; this outer casing is split along its length and the clamping screw is so arranged that one turn of the button 33 locks the outer casing to the telescopic rod so that the index box 29 which is connected to the button through the telescopic rod now forms a fixed part of the angle formation mechanism. The mechanism is now rotated so that the angle formation locator coincides with the angle of the foot being measured and when this has been so adjusted one of the code letters corresponding to this particular angle of toe is brought into position for recording.

The various cords for measuring the girth of the various parts are connected up by joining the brooches or the like and the index boxes connected with such cords are also brought into position for recording. The card is now inserted into the receptacle provided for the same and by pressing a lever or levers a printed record is obtained of all the particulars required.

When the brooches or the like have been disconnected and the button or other member associated with the telescopic rod has been returned, the foot or last may be removed and all the slides and index boxes returned to their zero or normal position under the influence of gravity.

Having now described my invention, what I claim as new and desire to secure by Letters Patent is:—

1. Foot and last measuring apparatus comprising a base, a heel locator, and a toe locator mounted thereon, a sole plate slidable longitudinally of the base according to the length of the foot, a measuring cord attached to said sole plate and adapted to encircle the foot at the ball joint, and a slidable indicator connected to and moved by said cord so that it is controlled both by the length of the foot and by the girth at the ball joint.

2. Foot and last measuring apparatus comprising a base, a heel locator and a toe locator mounted thereon, a sole plate slidable longitudinally of the base, an indicator movable with said sole plate, a measuring cord adapted to encircle the foot in the neighbourhood of the ball joint and having one end fixed to said indicator and the other end to a fixed point in the apparatus, and guide tubes enclosing said cord.

3. Foot and last measuring apparatus comprising a base, a heel locator and a toe locator mounted thereon, a sole plate slidable longitudinally of said base, ball joint locators carried by said sole plate, guide tubes connected to said ball joint locators, a flexible measuring cord within said guide tubes adapted to encircle the foot in the neighbourhood of the ball joint, and having one end secured to a fixed point of the apparatus and an indicator movable with said sole plate and connected to the other end of said cord.

4. Foot and last measuring apparatus comprising a base, a heel locator and a toe locator mounted thereon, a sole plate slidable longitudinally of said base, an indicator subject to control both by the length of the foot and of the girth at the ball joint, a pivotal toe angle joint locator mounted on said base, and a flexible cord associated at one end with said toe angle joint locator and at its other end with a second indicator.

5. Foot and last measuring apparatus comprising a base, a heel locator and a toe locator mounted thereon, a sole plate slidable longitudinally of said base, an indicator subject to control both by the length of the foot and by the girth of the ball joint, a flexible measuring cord adapted to encircle the instep of the foot or last and having one end connected to the movable sole plate and an automatic, slidable indicator mounted beneath said base connected to the other end of said cord.

6. Foot and last measuring apparatus comprising a base, a heel locator and a toe locator mounted thereon, a sole plate slidable longitudinally of said base, an indicator subject to control both by the length of the foot and by the girth of the ball joint, a flexible measuring cord adapted to encircle the ankle of the foot or last and having one end connected to said movable sole plate and a slidable indicator connected to the other end of said measuring cord, and adapted to be moved thereby.

7. Foot and last measuring apparatus comprising a base, a heel locator and a toe locator mounted thereon, a sole plate slidable longitudinally of said base, ball joint locators carried by said sole plate, guide tubes connected with said ball joint locators, a flexible measuring cord carried in said guide tubes and having one end fixed to a fixed portion of the apparatus, an indicator movable with said sole plate and connected to the other end of said cord, a second flexible measuring cord adapted to encircle the instep of the foot or last and having one end secured to said sole plate and an indicator connected to the other end of said last mentioned measuring cord.

8. Foot and last measuring apparatus comprising a base, a heel locator and a toe locator mounted thereon, a sole plate slidable longitudinally of said base, ball joint locators carried by said sole plate, guide tubes secured to said ball joint locators, a flexible measuring cord carried in said guide tubes mounted beneath said base and having one end secured to a fixed point in the apparatus, an indicator movable with said sole plate and connected to the other end of said cord, a pivotal toe angle locator carried by said base and an indicator connected to and movable with said toe angle locator.

9. Foot and last measuring apparatus comprising a base, a heel locator and a toe locator mounted thereon, a sole plate slidable longitudinally of said base, ball joint locators carried by said sole plate, guide tubes connected to said ball joint locators, a flexible measuring cord carried in said guide tubes and having one end secured to a fixed point in the apparatus, an indicator movable with said sole plate and connected to the other end of said measuring cord, a second flexible measuring cord carried beneath said sole plate by a second set of guide tubes adapted to encircle the ankle of the foot or last and having one end connected to said movable sole plate and an indicator connected to the other end of said last mentioned cord.

10. Foot and last measuring apparatus comprising a base, a heel locator and a toe locator mounted thereon, a sole plate slidable longitudinally of said base, a plurality of flexible cords adapted to encircle said foot or last at the ball joint, the instep and the ankle, one end of each of the cords being connected to an indicator, the other end of said ball joint and said instep and ankle encircling cords being connected to a fixed point on said apparatus and to the movable sole plate respectively.

11. Foot and last measuring apparatus comprising a base, a heel locator and a toe locator mounted thereon, a sole plate slidable longitudinally of said base, and an indicator subject to control both by the length of the foot and of the girth at the ball joint and a pivotal toe angle joint mounted on said base and adapted to be fixed centrally on the axis of said sole plate, a flexible cord and a telescopic clamping device adapted to clamp the cord when the pivotal toe angle joint is fixed centrally.

12. Foot and last measuring apparatus according to claim 11, having a linkage between the toe angle joint locator and said flexible cord, the other end of the cord being connected to a second indicator.

In testimony whereof I have signed my name to this specification.

ERNEST WALTER SIDWELL.